United States Patent
Yokota

(10) Patent No.: US 6,759,482 B1
(45) Date of Patent: Jul. 6, 2004

(54) THREE-PIECE SOLID GOLF BALL

(75) Inventor: Masatoshi Yokota, Akashi (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/276,716

(22) Filed: Mar. 26, 1999

(30) Foreign Application Priority Data

Mar. 27, 1998 (JP) ............................................ 10/081083

(51) Int. Cl.$^7$ .......................... A63B 37/06; A63B 37/12
(52) U.S. Cl. ........................ 525/261; 473/373; 473/374
(58) Field of Search .......................... 525/261; 473/373, 473/374

(56) References Cited

U.S. PATENT DOCUMENTS

| | | | | |
|---|---|---|---|---|
| 5,697,856 A | * | 12/1997 | Moriyama | |
| 5,713,802 A | * | 2/1998 | Moriyama | |
| 5,730,663 A | * | 3/1998 | Tanaka | |
| 5,730,664 A | * | 3/1998 | Asakura | |
| 6,015,356 A | * | 1/2000 | Sullivan | |

FOREIGN PATENT DOCUMENTS

| | | |
|---|---|---|
| JP | 6142228 | 5/1994 |
| JP | 8322962 | 12/1996 |
| JP | 9239068 | 9/1997 |

* cited by examiner

Primary Examiner—David J. Buttner
(74) Attorney, Agent, or Firm—Birch, Stewart, Kolasch & Birch, LLP

(57) ABSTRACT

The present invention provides a three-piece solid golf ball having excellent flight performance and good shot feel when hit by an iron club, and, excellent controllability and good shot feel when hit by a driver. The present invention relates to a three-piece solid golf ball including a core, an intermediate layer formed on the core, and a cover covering the intermediate layer, wherein the core has a JIS-C surface hardness of 65 to 83 and a deformation of 2.8 to 5.3 mm when applying an initial load of 10 kgf to a final load of 130 kgf on the core, a JIS-C hardness of the core is substantially uniform from its center to surface, the intermediate layer has a Shore D hardness of 63 to 70, the cover has a Shore D hardness of 45 to 62, and a Shore D hardness difference between the intermediate layer and the cover is 3 to 20.

9 Claims, 1 Drawing Sheet

THREE-PIECE SOLID GOLF BALL

FIELD OF THE INVENTION

The present invention relates to a three-piece solid golf ball. More particularly, it relates to a three-piece solid golf ball having excellent flight performance and good shot feel when hit by a driver, and excellent controllability and good shot feel when hit by an iron club.

BACKGROUND OF THE INVENTION

Many types of golf balls are commercially selling, but two-piece solid golf balls and thread wound golf balls are generally used during rounds of golf. The two-piece solid golf ball, when compared with the thread wound golf ball, has better durability and better flight performance because of larger initial velocity when hitting and longer flight distance. Therefore, the two-piece solid golf ball is generally approved of or employed by many golfers. On the other hand, the two-piece solid golf ball has poor shot feel at the time of hitting an poor controllability or approach shots because of a lower spin rate.

In order to provide a two-piece solid golf ball having shot feel and controllability as good as the thread wound golf ball, a soft type two-piece solid golf ball using a softer core or cover has been proposed. However, the use of the soft core or soft cover adversely affects rebound characteristics, thus resulting, in the reduction of flight distance and the deterioration of durability.

It has also been proposed that an intermediate layer be placed between the core d the cover of the two-piece solid golf ball to maintain a balance between flight performance and shot feel at the time of hitting to maintain controllability (such as Japanese Patent Kokai Publication No. 142228/1994, Japanese Patent Kokai Publication No. 322962/1996, Japanese Patent Kokai Publication No. 239068/1997). These golf balls adopt a three-piece structure in which the hardness or hardness distribution of a core, an intermediate layer and a cover is maintain without a proper range, to obtain shot feel and controllability similar to the thread wound golf ball. For example, Japanese Patent Kokai Publication No. 142228/1994 suggests a three-piece solid golf ball which comprises a two-layered core consisting of an inner core and an outer core, and a cover covering the core. The outer core has a Shore D hardness of 30 to 50 and a flexural modulus of 200 to 400 MPa, and the cover has a Shore D of 55 to 68 and a flexural modulus of 200 to 450 MPa. However, since the cover is harder than the intermediate layer (the outer core) in the golf ball, it has poor controllability.

Japanese Patent Kokai Publication No. 322962/1996 suggests a three-piece solid golf ball which comprises a core and a two-layered cover consisting of an inner cover and an outer cover. The core has a deformation amount of 3.5 to 6.5 mm when applying an initial load of 10 kgf to a final load of 130 kgf, the inner cover has a flexural modulus of 3,500 to 6,000 kgf/cm$^2$, the outer cover has a flexural modulus of 2,300 to all 5,500 kgf/cm$^2$, and the flexural modulus of the outer cover is lower by 50 kgf/cm$^2$ than that of the inner cover. In the golf ball, the outermost layer is made softer in order to improve the controllability. However, the cover is not sufficiently soft to improve the controllability, and the hardness of the core is not controlled to a proper range, and thus shot feel is poor.

Japanese Patent Kokai Publication No. 239068/1997 suggests a three-piece solid golf ball which comprises a core, an intermediate layer and a cover. The core has a JIS-C center hardness of not more than 75 and a JIS-C surface hardness of not more than 85, the hardness of the intermediate layer is higher than that of the surface of the core by not more than 5, and the hardness of the cover is lower than that of the intermediate layer by not more than 5. However, since the golf ball has a hardness difference between the center of the core and the surface of the core, the deformation amount is large, and thus shot feel and controllability are poor.

It is required to solve the above problem and provide a three-piece golf ball having better flight performance, better shot feel and better controllability.

OBJECTS OF THE INVENTION

A main object of the present invention is to provide a three-piece solid golf ball having excellent flight performance and good shot feel when hit by a driver, and excellent controllability and good shot feel when hit by an iron type club.

According to the present invention, the object described above has been accomplished by adjusting a hardness distribution and a deformation amount of the core when applying an initial load of 10 kgf to a final load of 130 kgf, and a hardness and specific gravity of the intermediate layer and cover to specified ranges, thereby providing a three-piece solid golf ball having excellent flight performance and good shot feel when hit by a driver, and excellent controllability and good shot feel when hit by an iron type club.

This object as well as other objects and advantages of the present invention will become apparent to those skilled in the art from the following description with reference to the accompanying drawings.

SUMMARY OF THE INVENTION

Figure 1:
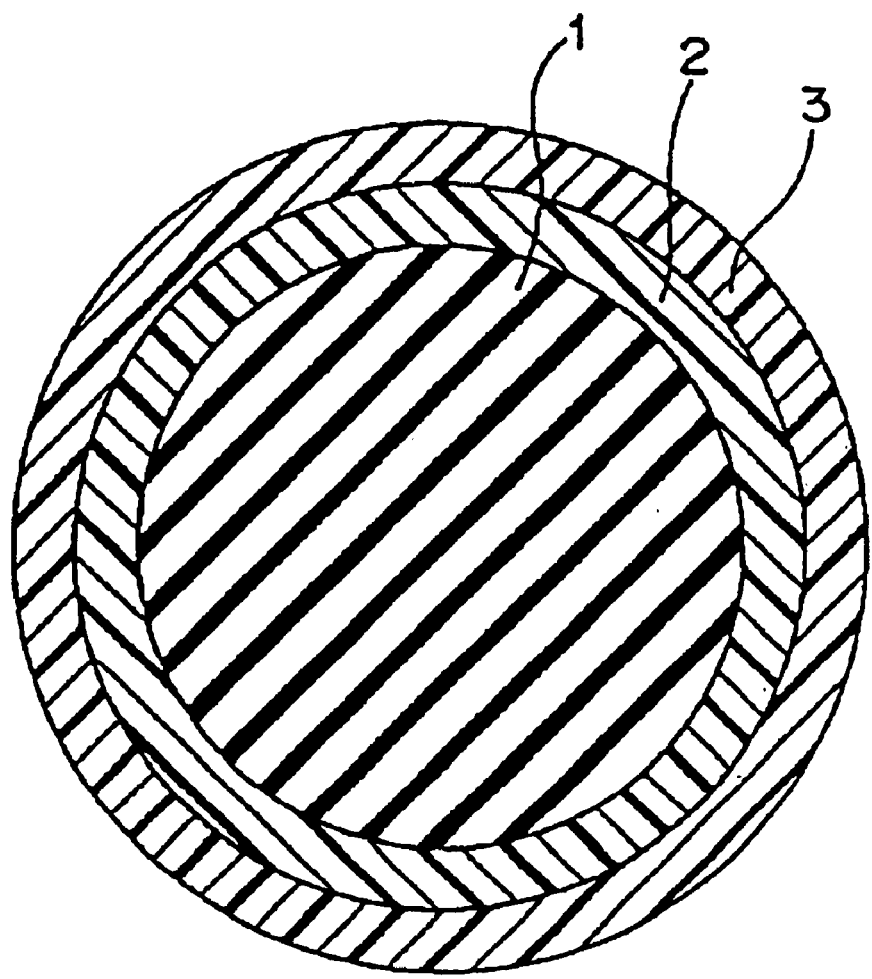
FIG. 1 is a schematic cross section illustrating one embodiment of the golf ball of the present invention.

The present invention provides a three-piece solid golf ball comprising a core, an intermediate layer formed on the core, and a cover covering the intermediate layer, wherein the core has a JIS-C surface hardness of 65 to 83 and a deformation of 2.8 to 5.3 mm when applying an initial load of 10 kgf to a final load of 130 kgf on the core, a JIS-C hardness of the core is substantially uniform from its center to surface, the intermediate layer has a Shore D hardness of 63 to 70, the cover has a Shore D hardness of 45 to 62, and a Shore D hardness difference between the intermediate layer and the cover is 3 to 20.

DETAILED DESCRIPTION OF THE INVENTION

The three-piece solid golf ball of the present invention will be explained with reference to the accompanying drawing in detail. FIG. 1 is a schematic cross section illustrating one embodiment of the three-piece solid golf ball of the present invention. As shown in FIG. 1, the golf ball of the present invention comprises a core 1, an intermediate layer 2 formed on the core 1, and a cover 3 covering the intermediate layer 2. The core 1 is obtained by press-molding and vulcanizing a rubber composition using a method and condition which have been conventionally used for preparing the core of solid golf balls. The rubber composition contains a base rubber, a co-crosslinking agent, an organic peroxide, an organic sulfide compound, and optionally a filler, an antioxidant and the like.

The base rubber used for the core 1 of the present invention may be natural rubber and/or synthetic rubber which has been conventionally used for solid golf balls. Preferred is high-cis polybutadiene rubber containing not less than 40%, preferably not less than 80% of a cis-1, 4 bond. The high-cis polybutadiene rubber may be mixed with natural rubber, polyisoprene rubber, styrene-butadiene rubber, ethylene-propylene-diene rubber (EPDM) and the like.

The co-crosslinking agent can be a metal salt of α,β-unsaturated carboxylic acid, including mono or divalent metal salts, such as zinc or magnesium salts of α,β-unsaturated carboxylic acids having 3 to 8 carbon atoms (e.g. acrylic acid, methacrylic acid, etc.). Preferred co-crosslinking agent is zinc acrylate because it imparts high rebound characteristics to the resulting golf ball. An amount of the metal salt of the unsaturated carboxylic acid in the rubber composition may be from 20 to 32 parts by weight, preferably from 22 to 30, parts by weight, based on 100 parts by weight of the base rubber. When the amount of the metal salt of the unsaturated carboxylic acid is smaller than 20 parts by weight, the core is too soft, and rebound characteristics are degraded to reduce flight distance. On the other hand, when the amount of the metal salt of the unsaturated carboxylic acid is larger than 32 parts by weight, the core is too hard, and shot feel is poor.

The organic peroxide includes, for example, dicumyl peroxide, 1,1-bis(t-butylperoxy)-3,3,5-trimethylcyclohexane, 2,5-dimethyl-2,5-di(t-butylperoxy) hexane, di-t-butyl peroxide and the like. Preferred organic peroxide is dicumyl peroxide. An amount of the organic peroxide may be from 0.5 to 3.0 parts by weight, preferably 0.8 to 2.5 parts by weight, based on 100 parts by weight of the base rubber. When the amount of the organic peroxide is smaller than 0.5 parts by weight, the core is too soft and rebound characteristics are degraded to reduce flight distance. On the other hand, when the amount of the organic peroxide is larger than 3.0 parts by weight, the core is too hard, and thus shot feel is poor.

The organic sulfide compound includes polysulfides having 2 to 4 sulfur atoms, such as diphenyl polysulfide, dibenzyl polysulfide, dibenzoyl polysulfide, dibenzothiazoyl polysulfide, dithiobenzoyl polysdlfide and the like. Preferred organic sulfide compound is diphenyl disulfide, in view of rebound characteristics. An amount of the organic sulfide compound may be from 0.05 to 5.0 parts by weight, preferably from 0.1 to 4.0 parts by weight, based on 100 parts by weight of the base rubber. When the amount of the organic sulfide compound is smaller than 0.05 parts by weight, the technical effects accomplished by using the organic sulfide compound are not sufficiently obtained. On the other hand, when the amount of the organic sulfide compound is larger than 5.0 parts by weight, the technical effects are not improved more. By using the organic sulfide compound in the rubber composition for the core, the crosslinkage of the rubber by co-crosslinking agent shows high density, and rebound characteristics are improved.

The rubber composition for the core of the golf ball of the present invention can contain other components, which have been conventionally used for preparing the core of solid golf balls, such as inorganic filler (such as zinc oxide, barium sulfate, calcium carbonate and the like), high specific gravity metal powder filler (such as tungsten powder, molybdenum powder and the like), antioxidant or peptizing agent. If used, an amount of the antioxidant is preferably 0.2 to 0.5 parts by weight, based on 100 parts by weight of the base rubber.

The core 1 is obtained by mixing the above rubber composition, and then vulcanizing and press-molding the mixture in a mold. The core of the golf ball of the present invention has a JIS-C surface hardness of. 65 to 83, preferably 67 to 81. When the surface hardness of the core is smaller than 65, rebound characteristics are degraded. On the other hand, when the surface hardness of the core is larger than 83, shot feel is hard and poor. In the golf ball of the present invention, a JIS-C hardness of the core is substantially uniform from its center to surface. In this context, the wording "substantially uniform" means that a distribution of JIS-C hardness, when determined at any point between its center and its surface, is within the range of 5, more preferably within the range of 3. When the hardness difference between any two points from its center to surface in the core is larger than 5, rebound characteristics are degraded and launch angle is low to reduce flight distance. The term ,hardness of a core, other than surface; hardness of the core as used herein refers to a hardness, which is obtained by cutting the core into two equal parts and then measuring a hardness.

The core of the golf ball of the present invention has a deformation amount of 2.8 to 5.3 mm, preferably 3.0 to 5.0 mm, more preferably 3.1 to 4.9 mm when applying from an initial load of 10 kgf to a final load of 130 kgf on the core. When the deformation amount is smaller than 2.8 mm, the core is too hard and the shot feel of the resulting golf ball is poor. On the other hand, when the deformation amount is larger than 5.3 mm, the core is too soft and rebound characteristics are degraded to reduce flight distance.

Molding the core within the ranges described above can be conducted by adjusting the vulcanization condition. The core having the above hardness and deformation amount can be obtained by vulcanizing and press-molding the rubber composition, for example, at 130 to 150° C. for 10 to 37 minutes, and then 150 to 180° C. for 3 to 20 minutes. The core of the golf ball of the present invention has a diameter of 32.7 to 38.4 mm, preferably 33.0 to 38.0 mm. When the diameter of the core is smaller than 32.7 mm, the technical effects accomplished by the presence of the core, such as rebound characteristics and the like, are not sufficiently obtained. Therefore, rebound characteristics of the resulting golf ball are degraded. On the other hand, when the diameter is larger than 38.4 mm, it is required to reduce the thickness of the intermediate layer, the cover, or the both to a thickness less than a desired thickness. Therefore, the technical effects accomplished by the presence of the intermediate layer or the cover are not sufficiently obtained. The intermediate layer 2 is then formed on the core 1.

In the golf ball of the present invention, the intermediate layer 2 has a Shore D hardness of 63 to 70, preferably 64 to 68. When the Shore D hardness is smaller than 63, the intermediate layer is too soft and rebound characteristics are degraded to reduce flight distance on the other hand, the Shore D hardness is larger than 70, the intermediate layer is too hard and desired deformation amounts can not be obtained to degrade rebound characteristics, thus shot feel being poor. The intermediate layer 2 has a thickness of 1.0 to 2.5 mm, preferably 1.2 to 2.2 mm, more preferably 1.4 to 2.0 mm. When the thickness is smaller than 1.0 mm, the technical effects accomplished by the presence of the intermediate layer are not sufficiently obtained. On the other hand, when the thickness is larger than 2.5 mm, shot feel is poor. The intermediate layer has a specific gravity of not less than 1.2, preferably 1.2 to 1.5. When the specific gravity is smaller than 1.2, inertia of moment is reduced to degrade flight performance.

The material used for the intermediate layer 2 of the present invention is not limited, as long as the intermediate layer has the above physical properties, but preferred material is thermoplastic resin, in view of productivity, rebound characteristics, durability and the like. Examples of thermoplastic resins include ionomer resin, polyethylene resin, polyurethane resin, 1,2-polybutadiene, styrene-butadiene copolymer and the like, or the mixture thereof. The ionomer resin used in the present invention includes ethylene-(meth) acrylic acid copolymer, of which a portion of carboxylic acid groups is neutralized with metal ion. The metal ion which neutralizes a portion of carboxylic acid groups of the copolymer includes alkaline metal ion, such as sodium ion, potassium ion, lithium ion and the like; divalent metal ion, such as zinc ion, calcium ion, magnesium ion and the like; trivalent metal ion, such as aluminum ion, neodymium ion and the like; and the mixture thereof. Preferred are sodium ion, zinc ion, lithium ion and the like, in view of rebound characteristics, durability and the like. The ionomer resin is not limited, but examples thereof will be shown by a trade name thereof. Examples of the ionomer resin, which is commercially available from Mitsui Du Pont Polychemical Co., Ltd., include Hi-milan 1555,, Hi-milan 1557, Hi-milan 1605, Hi-milan 1652, Hi-milan 1705, Hi-milan 1706, Hi-milan 1707, Hi-milan 1855, Hi-milan 1856 and the like. Examples of the ionomer resin, which is commercially available from Du Pont U.S.A., include Surlyn AM7317, Surlyn AM7318, Surlyn 8320 and the like. Examples of the ionomer resin, which is commercially available from Exxon Chemical Co., include Iotek 7010, Iotek 8000 and the like. These ionomer resins are used alone or in combination thereof. Examples of polyethylene resins include UJ960, which is commercially available from Mitsubishi Chemical Co., Ltd. and the like. Examples of polyamide resins include Diamide E40-S3, E47-S3, and E55-S3, which are commercially available from Daicel Hulls Co., Ltd., and Pebax 5533SN00, 4033SN00 and 2533SN00, which are commercially available from Atochem Co. and the like. Examples of polyurethane include Elastoran ET880 and ET890, which are commercially available from Takeda Verdishe Co., Ltd., Pandex T-8180, which is commercially available from Dainippon Ink Chemical Co., Ltd. and the like.

The intermediate layer may optionally contain fillers in order to adjust the specific gravity, in addition to the material essentially containing the thermoplastic resin, such as ionomer resin, or the mixture thereof. Examples of fillers include inorganic filler (such as zinc oxide, barium sulfate, calcium carbonate and the like), high specific gravity metal powder filler (such as tungsten powder, molybdenum powder and the like), and the mixture thereof. The intermediate layer 2 of the present invention may contain additives, which has been conventionally used for golf ball cover, in addition to the above components, as long as the addition of the additives does not deteriorate the desired performance of the intermediate layer.

A method of forming the intermediate layer 2 is not specifically limited, but may be a well-known method, which has been conventionally used for forming golf ball cover. For example, there can be used a method comprising molding the intermediate layer composition into a semi-spherical half-shell, covering the solid core with the two half-shells, followed by pressure molding, or a method comprising injection molding the intermediate layer composition directly on the core to cover it. The cover 3 is then covered on the intermediate layer 2.

The cover 3 of the present invention has a Shore D hardness of 45 to 62, preferably 50 to 60, more preferably 55 to 60. When the Shore D hardness is smaller than 45, rebound characteristics are degraded to reduce flight distance. On the other hand, when the Shore D hardness is larger than 62, shot feel is poor, and controllability at approach shot is poor. A difference in Shore D hardness between the intermediate layer and cover is 3 to 20, preferably 3 to 18, more preferably 5 to 17. When the difference is smaller than 3, the technical effects accomplished by the presence of the intermediate layer are not sufficiently obtained. When the difference is larger than 20, the intermediate layer is too hard, and shot feel is poor. The cover 3 has a thickness of 1.0 to 2.5 mm, preferably 1.0 to 2.2 mm, more preferably 1.4 to 2.0 mm. When the thickness is smaller than 1.0 mm, the technical effects accomplished by the presence of the cover are not sufficiently obtained. On the other hand, when the thickness is larger than 2.5 mm, shot feel is poor. The cover 3 has a specific gravity of less than 1.2, preferably 0.8 to 1.2, more preferably 0.9 to 1.1. When the specific gravity is not less than 1.2, difference from specific gravity of the intermediate layer is too small, and thus the technical effects accomplished; by the presence of the intermediate layer are not sufficiently obtained.

The material used for the cover 3 of the present invention is not limited, as long as the cover has the above physical properties, but the material which has been conventionally used for solid golf ball cover can be used. Preferred material is thermoplastic resin. Examples of thermoplastic resins include ionomer resin, polyethylene resin, polyamide resin, polyurethane resin, 1,2-polybutadiene, styrene-butadiene copolymer and the like, or the mixture thereof, which are the same materials as used for the intermediate layer 2.

The cover used in the present invention may optionally contain fillers (such as barium sulfate, calcium carbonate, etc.), pigments (such as titanium dioxide, etc.), and the other additives such as a dispersant, an antioxidant, a UV absorber, a photostabilizer and a fluorescent agent or a fluorescent brightener, etc., in addition to the resin component, as long as the addition of the additives does not deteriorate the desired performance of the golf ball cover. An amount of the pigment is preferably 0.1 to 0.5 parts by weight, based on 100 parts by weight of the resin component for the cover.

A method of covering the core with the cover 3 is not specifically limited, but may be the same method as used in the intermediate layer. At the time of cover molding, many depressions called "dimples" may be optionally formed on the surface of the golf ball. Furthermore, paint finishing or marking stamp may be optionally provided after cover molding for serving commercial sell. The three piece solid golf ball of the present invention is formed, so that it has a diameter of not less than 42.67 mm and a weight of not more than 45.93 g, according to the PGA rule.

EXAMPLES

The following Examples and Comparative Examples further illustrate the present invention in detail but are not to be construed to limit the scope of the present invention.

Examples 1 to 6 and Comparative Examples 1 to 8
(i) Production of Core

The rubber compositions for the core shown in Table 1 (Example) and Table 2 (Comparative Example) were mixed with a mixing roll, and then vulcanized by press-molding at the vulcanization condition shown in the same Tables to obtain spherical cores having a diameter of 35.1 mm. The hardness distribution and deformation ,amount of the resulting core were measured. The results are shown in Table 4

(Example) and Table 5 (Comparative Example). The test methods are described later.

TABLE 1

| Core composition | (parts by weight) Example No. | | | | | |
|---|---|---|---|---|---|---|
| | 1 | 2 | 3 | 4 | 5 | 6 |
| BR18 *1 | 100 | 100 | 100 | 100 | 100 | 100 |
| Zinc acrylate | 22 | 26 | 30 | 26 | 26 | 26 |
| Zinc oxide | 18.3 | 16.8 | 15.2 | 16.8 | 16.8 | 16.8 |
| Antioxidant *2 | 0.5 | 0.5 | 0.5 | 0.5 | 0.5 | 0.5 |
| Dicuinyl peroxide | 1.5 | 1.5 | 1.5 | 1.5 | 1.5 | 1.5 |
| Diphenyl disulfide | 0.5 | 0.5 | 0.5 | 0.5 | 0.5 | 0.5 |
| Vulcanization condition | *a | *a | *a | *a | *a | *b |

TABLE 2

| Core composition | (parts by weight) Comparative Example No. | | | | | | | |
|---|---|---|---|---|---|---|---|---|
| | 1 | 2 | 3 | 4 | 5 | 6 | 7 | 8 |
| BR18 *1 | 100 | 100 | 100 | 100 | 100 | 100 | 100 | 100 |
| Zinc acrylate | 18 | 24 | 30 | 36 | 26 | 26 | 26 | 26 |
| Zinc oxide | 19.8 | 17.5 | 15.2 | 12.9 | 16.8 | 16.8 | 16.8 | 16.8 |
| Antioxidant *2 | 0.5 | 0.5 | 0.5 | 0.5 | 0.5 | 0.5 | 0.5 | 0.5 |
| Dicumyl peroxide | 1.5 | 1.5 | 1.5 | 1.5 | 1.5 | 1.5 | 1.5 | 1.5 |
| Diphenyl disulfide | 0.5 | 0.5 | 0.5 | 0.5 | 0.5 | 0.5 | 0.5 | 0.5 |
| Vulcanization condition | *a | *c | *c | *a | *a | *a | *a | *a |

*1: High-cis Polybutadiene rubber (trade name "BR18") available from JSR Co., Ltd.
*2: Antioxidant (trade name "Yoshinox 425") from Yoshitomi Pharmaceutical Ind., Ltd.
Vulcanization condition
*a: at 140° C. for 30 minutes, and then 160° C. for 10 minutes
*b: at 145° C. for 25 minutes, and then 160° C. for 10 minutes
*c: at 160° C. for 25 minutes (ii) Preparation of Intermediate Layer Compositions and Cover Compositions The formulation materials shown in Table 3 were mixed using a kneading type twin-screw extruder to obtain pelletized intermediate layer compositions and cover compositions. The extrusion condition was, a screw diameter of 45 mm, a screw speed of 200 rpm, and a screw L/D of 35.

The formulation materials were heated at 200 to 260° C. at the die position of the extruder. The Shore D hardness of the resulting intermediate layer compositions and cover compositions were shown in Table 4 and Table 5. The test methods are described later.

TABLE 3

| | (parts by weight) | | | | | | | |
|---|---|---|---|---|---|---|---|---|
| | Intermediate layer | | | | Cover | | | |
| Composition | A | B | C | D | E | F | G | H |
| Hi-milan 1555 *3 | — | — | 50 | 50 | — | 5 | 5 | 5 |
| Hi-milan 1605 *4 | — | 50 | — | — | 50 | — | — | — |
| Hi-milan 1706 *5 | — | 50 | 50 | — | 50 | — | — | — |
| Hi-milan 1855 *6 | — | — | — | 50 | — | 95 | 80 | — |
| Surlyn AM7317 *7 | 50 | — | — | — | — | — | — | — |
| Surlyn AM7318 *8 | 50 | — | — | — | — | — | — | — |
| Surlyn 8320 *9 | — | — | — | — | — | — | 15 | 95 |
| Tungsten | 34 | 34 | 34 | 34 | — | — | — | — |
| Titanium dioxide | — | — | — | — | 2 | 2 | 2 | 2 |
| Barium sulfate | — | — | — | — | 2 | 2 | 2 | 2 |
| Specific gravity | 1.25 | 1.25 | 1.25 | 1.25 | 0.97 | 0.97 | 0.97 | 0.97 |

*3: Hi-milan 1555 (trade name), ethylene-methacrylic acid copolymer ionomer resin obtained by neutralizing with sodium ion, manufactured by Mitsui Du Pont Polychemical Co., Ltd.
*4: Hi-milan 1605 (trade name), ethylene-methacrylic acid copolymer ionomer resin obtained by neutralizing with sodium ion, manufactured by Mitsui Du Pont Polychemical Co., Ltd.
*5: Hi-milan 1706 (trade name), ethylene-methacrylic acid copolymer ionomer resin obtained by neutralizing with zinc ion, manufactured by Mitsui Du Pont Polychemical Co., Ltd.
*6: Hi-milan 1855 (trade name), ethylene-methacrylic acid-isobutyl acrylate terpolymer ionomer resin obtained by neutralizing with zinc ion, manufactured by Mitsui Du Pont Polychemical Co., Ltd.
*7: Surlyn AM7317 (trade name), ethylene-methacrylic acid copolymer ionomer resin obtained by neutralizing with zinc ion, manufactured by DuPont USA Co.
*8: Surlyn AM7318 (trade name), ethylene-methacrylic acid copolymer ionomer resin obtained by neutralizing with sodium ion, manufactured by DuPont USA Co.
*9: Surlyn 8320 (trade name), ethylene-methacrylic acid copolymer ionomer resin obtained by neutralizing with sodium ion, manufactured by DuPont USA Co.

(iii) Formation of Intermediate Layer

The formulation materials for the intermediate layer shown in Table 4 (Example) and Table 5 (Comparative Example) were injection molded on the cores to form intermediate layers having a thickness of 1.9 mm. The Shore D hardness of the resulting intermediate layers was shown in Table 4 (Example) and Table 5 (Comparative Example). The test methods are described later.

(iv) Production of Golf Ball

The cover compositions shown in Table 3 (Example) and Table 5 (Comparative Example) were covered on the resulting intermediate layer by injection molding. Then, deflashing, surface pretreatment for painting, paint and the like, which are generally done on the surface of a golf ball, were conducted on the surface to produce a golf ball having a weight of 45.4 g and a diameter of 42.7 mm. With respect to the resulting golf balls, deformation amount, flight distance, shot feel at the time of hitting (by a driver, No. 5 iron club and a sand wedge) and controllability at approach shot (by No. 5 iron club and a sand wedge) were measured or evaluated. The results are shown in Table 6 (Example) and Table 7 (Comparative Example). The test methods are as follows.

Test Method (1) Deformation Amount

The deformation amount was determined by applying an initial load of 10 kg to a final load of 130 kg on the core or golf ball.

(2) Shore D Hardness of Cover

The Shore D hardness was determined according to ASTM D-2240, using a sample of a stack of the; three or more sheets which were obtained by heat and press molding the each cover composition into a sheet having a thickness of about 2 mm and storing at 23° C. for 2 weeks.

(3) Flight distance

A No. 1 wood club (a driver) was mounted to a swing robot manufactured by True Temper Co. and the resulting golf ball was hit at a head speed of 45 m/second, flight distance to the firstly dropping point on the ground (carry) was measured.

(4) Shot feel and controllability

The shot feel of the golf ball is evaluated by 10 professional golfers according to a practical hitting test using a driver (a No. 1 wood club). The controllability of the golf ball is evaluated by 10 professional golfers according to a practical hitting test at 30 yards approach shot using a sand wedge. The evaluation criteria are as follows.

Evaluation Criteria

○: Not less than 8 out of 10 golfers felt that the golf ball has good shot feel and good controllability.

Δ: From 4 to 7 out of 10 golfers felt that the golf ball has good shot feel and good controllability.

×: Not more than 3 out of 10 golfers felt: that the golf ball has good shot feel and good controllability.

TABLE 4

| Test item | Example No. | | | | | |
|---|---|---|---|---|---|---|
| | 1 | 2 | 3 | 4 | 5 | 6 |
| (Core) JIS-C hardness | | | | | | |
| Center point | 68 | 73 | 80 | 73 | 73 | 70 |
| 5 mm from center point | 69 | 74 | 79 | 74 | 74 | 72 |
| 10 mm from center point | 69 | 74 | 80 | 74 | 74 | 74 |
| Surface | 68 | 74 | 80 | 74 | 74 | 74 |
| Range | 1 | 1 | 1 | 1 | 1 | 4 |
| Deformation amount (mm) | 4.9 | 4.0 | 3.2 | 4.0 | 4.0 | 4.2 |
| (Intermediate layer) | | | | | | |
| Composition | B | B | B | C | B | B |
| Shore D hardness | 68 | 68 | 68 | 64 | 68 | 68 |
| (Cover) | | | | | | |
| Composition | F | F | F | F | G | F |
| Shore D hardness | 58 | 58 | 58 | 58 | 52 | 58 |

TABLE 5

| Test item | Comparative Example No. | | | | | | | |
|---|---|---|---|---|---|---|---|---|
| | 1 | 2 | 3 | 4 | 5 | 6 | 7 | 8 |
| (Core) JIS-C hardness | | | | | | | | |
| Center point | 60 | 60 | 65 | 85 | 73 | 73 | 73 | 73 |
| 5 mm from center point | 61 | 66 | 71 | 86 | 74 | 74 | 74 | 74 |
| 10 mm from center point | 62 | 70 | 76 | 86 | 74 | 74 | 74 | 74 |
| Surface | 62 | 75 | 82 | 86 | 74 | 74 | 74 | 74 |
| Range | 2 | 15 | 17 | 1 | 1 | 1 | 1 | 1 |
| Deformation amount (mm) | 5.8 | 4.5 | 3.5 | 2.1 | 4.0 | 4.0 | 4.0 | 4.0 |
| (Intermediate layer) | | | | | | | | |
| Composition | B | B | B | B | A | D | B | B |
| Shore D hardness | 68 | 68 | 68 | 68 | 72 | 62 | 68 | 68 |

TABLE 5-continued

| Test item | Comparative Example No. | | | | | | | |
|---|---|---|---|---|---|---|---|---|
| | 1 | 2 | 3 | 4 | 5 | 6 | 7 | 8 |
| (Cover) | | | | | | | | |
| Composition | F | F | F | F | F | F | E | H |
| Shore D hardness | 58 | 58 | 58 | 58 | 58 | 58 | 67 | 40 |

TABLE 6

| Test item | Example No. | | | | | |
|---|---|---|---|---|---|---|
| | 1 | 2 | 3 | 4 | 5 | 6 |
| Deformation amount (mm) | 3.1 | 2.6 | 2.3 | 2.7 | 2.7 | 2.7 |
| Carry (yard) | 224 | 225 | 225 | 225 | 223 | 225 |
| Shot feel | | | | | | |
| Driver | ○ | ○ | ○ | ○ | ○ | ○ |
| No. 5 iron club | ○ | ○ | ○ | ○ | ○ | ○ |
| Sand wedge | ○ | ○ | ○ | ○ | ○ | ○ |
| Controllability | | | | | | |
| No.5 iron club | ○ | ○ | ○ | ○ | ○ | ○ |
| Sand wedge | ○ | ○ | ○ | ○ | ○ | ○ |

TABLE 7

| Test item | Comparative Example No. | | | | | | | |
|---|---|---|---|---|---|---|---|---|
| | 1 | 2 | 3 | 4 | 5 | 6 | 7 | 8 |
| Deformation amount (mm) | 3.6 | 2.9 | 2.3 | 1.9 | 2.4 | 2.8 | 2.3 | 2.8 |
| Carry (yard) | 219 | 220 | 221 | 222 | 223 | 221 | 224 | 218 |
| Shot feel | | | | | | | | |
| Driver | X | Δ | Δ | X | X | Δ | X | X |
| No. 5 iron club | X | Δ | X | X | X | Δ | X | X |
| Sand wedge | X | X | Δ | Δ | X | Δ | X | Δ |
| Controllability | | | | | | | | |
| No. 5 iron club | X | X | X | X | X | X | X | X |
| Sand wedge | X | Δ | Δ | X | Δ | X | X | Δ |

As is apparent from the comparison of the physical properties of the golf balls of Examples 1 to 6 shown in Table 6 with those of the golf balls of Comparative Examples 1 to 8 shown in Table 7, the golf balls of the present invention of Examples 1 to 6 have longer flight distance, better shot feel and controllability when hit by a driver and an irons club than the golf ball of Comparative Examples 1 to 8.

On the other hand, the golf ball of Comparative Example 1 has lower surface hardness of the core and larger deformation amount, and thus rebound characteristics are degraded to reduce flight distance. The golf ball of Comparative Examples 2 and 3 has broader hardness distribution, and thus rebound characteristics are degraded to reduce flight distance. The golf ball of Comparative Example 4 has larger surface hardness of the core, and thus has poor shot feel. The golf ball of Comparative Example 5 has higher hardness of the intermediate layer, and thus has poor shot feel. The golf ball of Comparative Example 6 has lower hardness of the intermediate layer, and thus rebound characteristics are degraded to reduce flight distance. The golf ball of Comparative Example 7 has higher hardness of the cover, and thus has poor shot feel. The golf ball of Comparative Example 8 has lower hardness of the cover, and thus rebound characteristics are degraded to reduce flight distance.

What is claimed is:

1. A three-piece solid golf ball comprising a core, an intermediate layer formed on the core, and a cover covering the intermediate layer, wherein the core has a JIS-C surface hardness of 65 to 83 wherein a distribution of JIS-C hardness, when determined at any two points between the center and the surface of the core has a difference of 5 or less and a deformation of 3.2 to 4.9 mm when applying an initial load of 10 kgf to a final load of 130 kgf on the core, the core is formed from a rubber composition comprising a base rubber, a co-crosslinking agent, an organic peroxide, and an organic sulfide compound, the organic sulfide compound being present in an amount of 0.05 to 5.0 parts by weight based on 100 parts by weight of the base rubber, the intermediate layer has a Shore D hardness of 63 to 70 and has a thickness of 1.0 to 2.5 mm, the cover has a Shore D hardness of 45 to 62, and a Shore D hardness difference between the intermediate layer and the cover is 3 to 20.

2. The three-piece solid golf ball according to claim 1, wherein the intermediate layer has a specific gravity of not less than 1.2 and the cover has a specific gravity of less than 1.2.

3. The three-piece solid golf ball according to claim 1, wherein the core is formed from a rubber composition comprising 20 to 32 parts by weight of a co-crosslinking agent, 0.5 to 3.0 parts by weight of an organic peroxide and 0.05 to 5 parts by weight of an organic sulfide compound, based on 100 parts by weight of cis-1,4-polybutadiene containing not less than 40 molar % of a cis-1,4 bond.

4. The three-piece solid golf ball according to claim 1, wherein the intermediate layer has thickness of 1.0 to 2.5 mm and the cover has a thickness of 1.0 to 2.5 mm.

5. The three-piece solid golf ball according to claim 1, wherein the core has a JIS-C surface hardness of 67 to 81.

6. The three-piece solid golf ball according to claim 1, wherein the intermediate layer has a Shore D hardness of 64 to 68.

7. The three-piece solid golf ball according to claim 1, wherein the cover has a Shore D hardness of 50 to 60.

8. The three-piece solid golf ball according to claim 1, wherein the cover has a Shore D hardness of 55 to 60.

9. The three-piece solid golf ball according to claim 5, wherein the intermediate layer has a Shore D hardness of 64 to 68.

* * * * *